United States Patent [19]

Fike

[11] 4,274,820
[45] Jun. 23, 1981

[54] LOCK SYSTEM FOR TIRE CURING APPARATUS

[76] Inventor: Louis T. Fike, Hacienda Heights, Calif. 91745

[21] Appl. No.: 153,763

[22] Filed: May 27, 1980

[51] Int. Cl.³ .......................... B29H 5/02; B29H 5/04
[52] U.S. Cl. ........................................ 425/29; 425/47; 425/17; 425/25
[58] Field of Search ...................... 425/29, 47, 17, 25

[56] References Cited

U.S. PATENT DOCUMENTS

| | | | |
|---|---|---|---|
| 2,204,531 | 6/1940 | Erbguth | 425/29 |
| 2,393,503 | 1/1946 | Bosomworth et al. | 425/47 |
| 2,851,726 | 9/1958 | Erikson | 425/47 X |
| 3,154,814 | 11/1964 | Fike | 425/47 X |
| 3,204,918 | 9/1965 | Bonin et al. | 249/191 |
| 3,315,311 | 4/1967 | Fike | 425/47 X |
| 3,474,499 | 10/1969 | Holmes | 425/47 |
| 3,484,903 | 12/1969 | Rawls | 425/29 |
| 3,635,611 | 1/1972 | Mapel | 425/47 |
| 4,035,118 | 7/1977 | MacMillan | 425/29 X |
| 4,044,600 | 8/1977 | Claxton et al. | 425/29 X |
| 4,194,717 | 3/1980 | Easton et al. | 249/192 |
| 4,212,605 | 7/1980 | MacMillan | 425/47 |

*Primary Examiner*—J. Howard Flint, Jr.
*Attorney, Agent, or Firm*—Fulwider, Patton, Rieber, Lee & Utecht

[57] ABSTRACT

A quick-release lock system for tire curing apparatus. The apparatus includes a lower matrix that receives the lower part of a tire to be cured, and an upper matrix that receives the upper part of the tire to be cured. The upper matrix is vertically separable from the lower matrix to receive the tire. A plurality of lock arms are interposed between the upper and lower matrices to secure such matrices together during a tire curing operation. The tire cannot be inflated unless the lock arms are each firmly secured in place.

9 Claims, 6 Drawing Figures

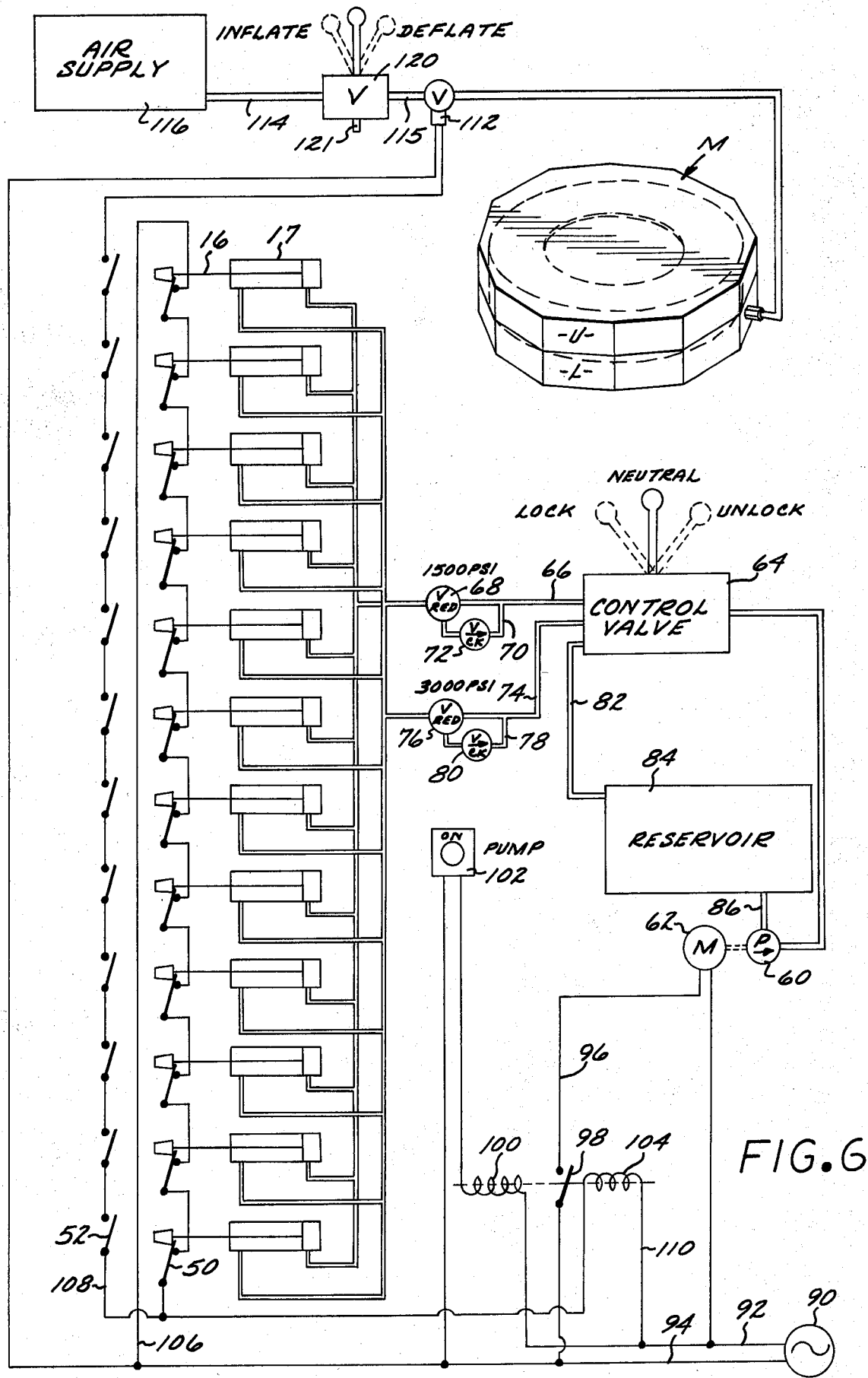

LOCK SYSTEM FOR TIRE CURING APPARATUS

BACKGROUND OF THE INVENTION

The present invention relates to the art of tire curing. Tire curing apparatus particularly adapted for retreading relatively large off-the-road tires, such as used on heavy trucks and earth moving equipment have been employed for several years. An example is disclosed in Louis T. Fike U.S. Pat. No. 3,154,814, issued Nov. 3, 1964. Such apparatus utilizes upper and lower matrices which are vertically separable so that the lower matrix can receive the lower part of a tire to be cured. The upper matrix receives the upper part of such tire. The tire is inflated during a curing operation. Prior to a tire curing operation, the upper matrix is secured to the lower matrix by vertically extending lock arms. It is essential that such lock arms be firmly locked to the upper matrix before the tire to be retreaded is inflated. If such lock arms are not firmly locked the upper mold can be blown off the lower mold due to the high pressures developed during the curing operation. Such an accident can result in severe physical injuries as well as costly property damage.

SUMMARY OF THE INVENTION

It is a major object of the present invention to provide a quick-release lock system for the aforedescribed type of tire curing apparatus, which prevents inflation of the tire to be retreaded unless all of the individual lock arms have been secured.

Another object of the present invention is to provide a quick-release lock system for a tire curing apparatus of the aforedescribed nature utilizing vertically extending lock arms secured at their lower ends to the lower matrix and being formed at their upper ends with a passage for receiving a horizontally movable wedge lock, such system including means for preventing inflation of the tire to be cured unless each of such wedge locks is properly positioned within its respective passage.

The lock system of the present invention utilizes wedge locks provided with a locking taper which firmly retains such locks in their locked positions.

It is an important object of the present invention that the lock system is power-operated thereby eliminating the time and effort required to operate a manual type of lock system.

A further object of the present invention is to provide a quick-release lock system of the aforedescribed nature wherein the wedge locks are operated by a hydraulically actuated cylinder and piston unit, which may, if desired, automatically employ more force to retract the wedge locks from their locked position within their respective passages than is employed to force such locks into a locked position within such passages.

Yet a further object of the present invention is to provide a quick-release lock system for tire curing apparatus of the aforedescribed nature which is simple in design and rugged of construction so as to provide a long and trouble free service life.

Other important objects and advantages of the lock system of the present invention will become apparent from the following detailed description.

BRIEF DESCRIPTION OF THE DRAWINGS

FIG. 6 is a schematic view showing the relationship of said lock system to said tire curing apparatus.

Figure 1:
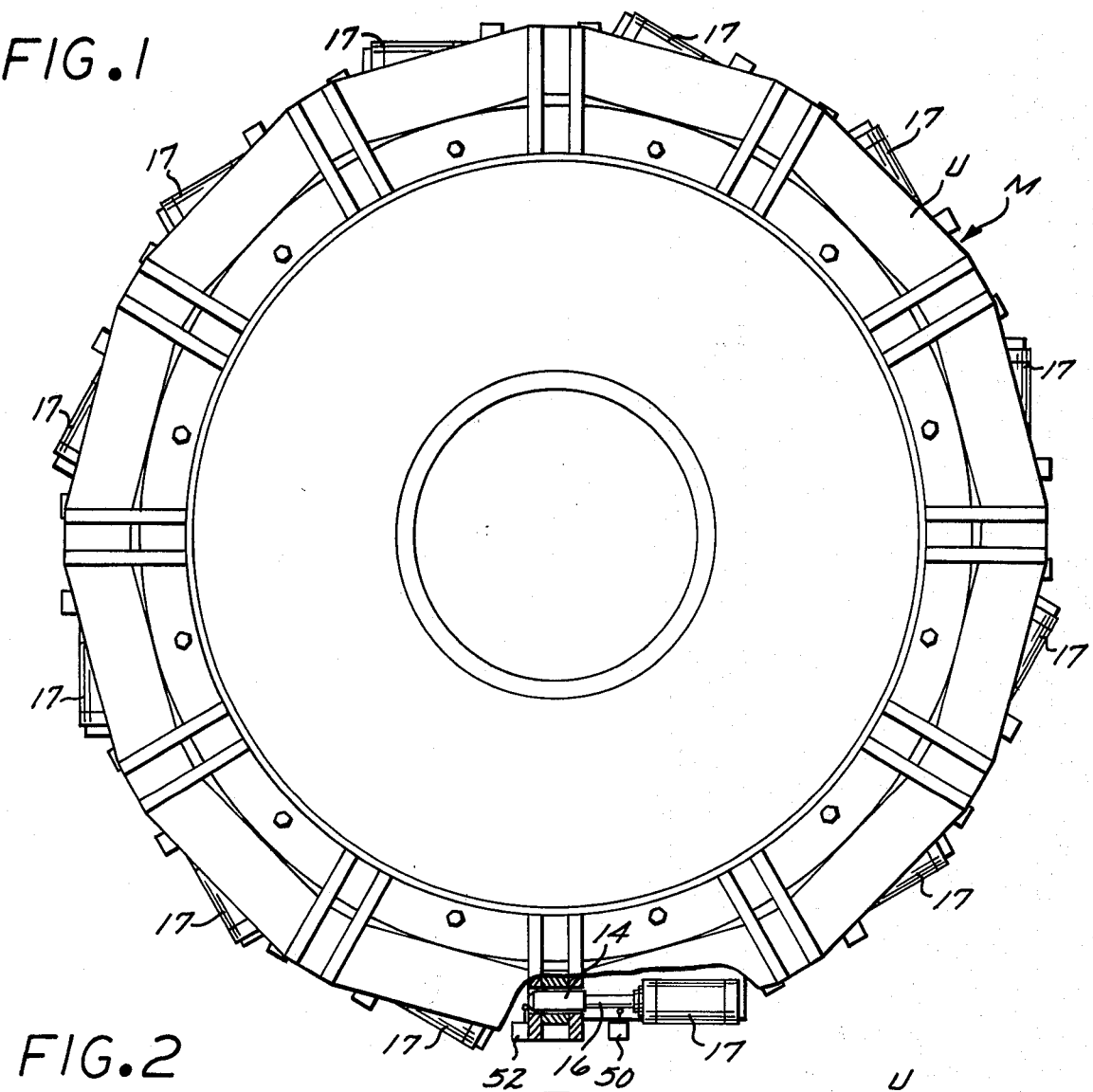
FIG. 1 is a top plan view of tire curing apparatus provided with a preferred form of lock system embodying the present invention.

Referring to the drawings, the tire curing apparatus provided with a preferred form of lock system embodying the present invention is of conventional construction, utilizing mold M having a lower matrix L that receives the lower part of a tire to be cured (not shown), and an upper matrix U that receives the upper part of such tire to be cured. The upper matrix U is vertically separable relative to the lower matrix L. Such vertical separation may be effected by means of a suitable hoist (not shown). The upper matrix U is locked against upward movement relative to lower matrix L by means of a plurality of like equidistantly circumferentially spaced lock arms, generally designated 10. The lower ends of such lock arms 10 are secured to the lower matrix L, while the upper ends thereof are each formed with a keeper 11 having a horizontally extending passage 12. Each horizontal passage 12 removably receives a horizontally movable wedge lock, generally designated 14 secured to the free end of the plunger 16 of a fluid-actuated cylinder 17. Cylinders 17 are rigidly affixed to equidistantly circumferentially-spaced points about the upper matrix. When upper matrix U is positioned upon lower matrix L keepers 11 are received between a pair of vertical lugs 18a and 18b formed with aligned openings 19a and 19b. At this time keeper passages 12 are in horizontal alignment with lug openings 18a and 18b. When the wedge locks 14 are positioned within their respective passages 12 bridging openings 19a and 19b and passages 12, upper matrix U will be firmly locked against vertical separation from lower matrix L. Upon retraction of such wedge locks 14 from their respective passages 12, the upper matrix may be lifted off of the lower matrix. It should be understood that all of the aforementioned parts are of like construction.

More particularly, each lock arm 10 includes a vertically extending rod 20 formed at its upper end with upper threads 22, and at its lower end with lower threads 24. The latter are threadably received within an internally threaded sleeve 26, which is rigidly affixed, as by welding, between a pair of vertical ears 30 and 32 that are in turn rigidly affixed, as by welding, to the outer surface of the lower matrix. Vertical adjustment of rod 20 relative to sleeve 26 is effected by an upper jam nut 34 and a lower adjustment nut 36, with a washer 38 being interposed between sleeve 26 and adjustment nut 36. The upper threads 22 of rod 20 are threadably received within a blind bore 42 formed in keeper 11. The aforementioned horizontal passage 12 is formed in the intermediate portion of keeper 11. The upper end of keeper 11 is beveled inwardly as indicated at 44. Lugs 18a and 18b are rigidly affixed, as by welding, to the upper matrix U. Each plunger 16 and its cylinder 17 is preferably hydraulically driven through suitable hydraulic conduits described more particularly hereinafter with relation to FIG. 6.

Figure 2:
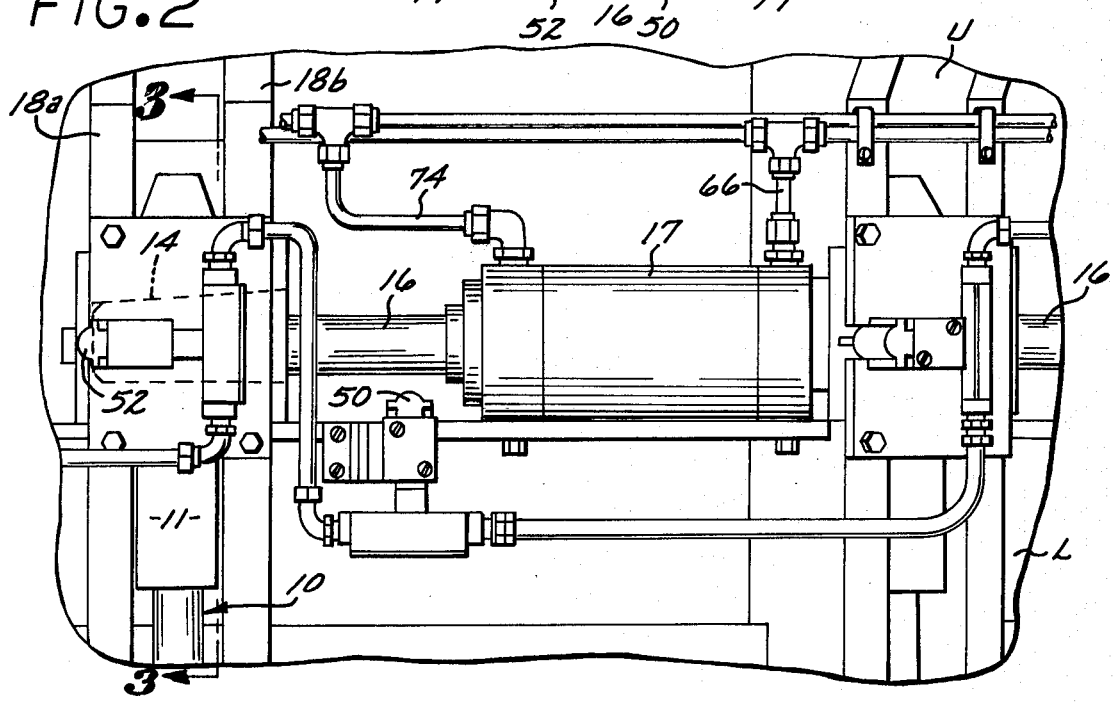
FIG. 2 is a broken side elevational view in enlarged scale showing a lock unit embodying the present invention as employed with the tire curing apparatus of FIG. 1.
Figure 3:
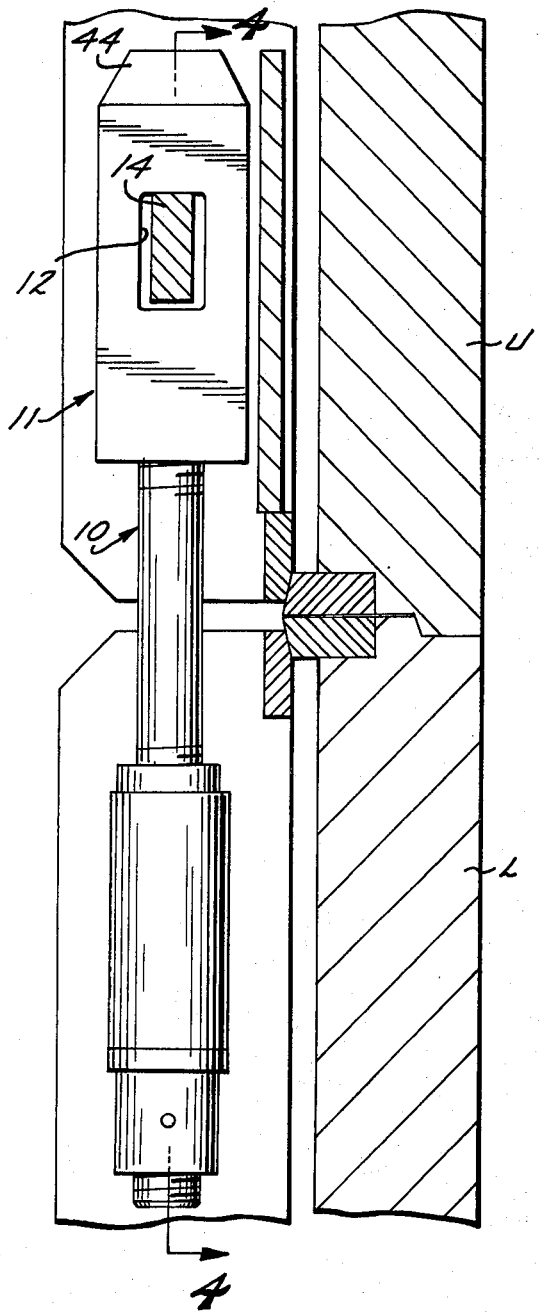
FIG. 3 is a vertical sectional view taken in further enlarged scale along line 3—3 of FIG. 2.

Referring now to FIGS. 1 and 2, a plurality of like conventional, electric, rear travel limit switches 50 are secured to the lower matrix L in a position to have their switch lever element engaged by the rear end of each wedge lock 14. A second forward travel limit switch of conventional construction 52 is affixed adjacent each lug 18a so that its switch lever element is engaged by the nose of each wedge lock as the latter passes through opening 19b.

Referring now to FIG. 6, there is shown a schematic view disclosing the relationship of the lock system to the aforedescribed tire curing apparatus. It should be understood that the schematic arrangement disclosed in FIG. 6 is merely representative of one form of a control arrangement which may be utilized with the aforedescribed apparatus. Pressurized hydraulic fluid for operating the piston and cylinder units 16, 17 is provided by a conventional hydraulic pump 60 driven by an electric motor 62. The flow of hydraulic fluid into cylinders 17 is effected by means of a conventional control valve 64. Pressurized hydraulic fluid flows to the rear of cylinders 17 from control valve 64 through an inlet conduit 66 wherein is positioned a first pressure reducing valve 68 set at a value such as 1500 psi. A bypass conduit 70 is provided with a check valve 72 leading back to conduit 66 from reducing valve 68. Pressurized hydraulic fluid enters the front of each cylinder 18 through a conduit 74, wherein is positioned a second pressure reducing valve 76 set at a value higher than value 68, such as 3,000 p.s.i. A bypass conduit 78 is provided with a second check valve 80 leading from pressure reduction valve 76 to conduit 74. A return line 82 connects control valve 64 with a reservoir 84 that in turn is in communication with pump 60 through line 86.

With continued reference to FIG. 6, a power source 90 for motor 62 is connected to a "ground" lead 92, and a "hot" lead 94. "Hot" lead 94 is connected to motor 62 by a lead 96 wherein is positioned motor switch 98. Motor switch 98 is moved to its closed position under the influence of coil 100 when an operator pushes an 'On" switch 102. Switch 98 is moved to its open position of FIG. 6 when coil 104 is actuated. Coil 100 when activated has a greater attraction for closing switch 98 than coil 104 has for maintaining the switch opening.

Rear travel switches 50 are arranged in series in a lead 106 extending from "hot" lead 94. Forward travel switches 52 are connected in series in a lead 108 which is also in series with the aforementioned coil 104 and "ground" lead 92, the opposite end of coil 104 being connected with the latter through lead 110. Lead 108 extends to the windings (not shown) of a solenoid operated air shut-off valve 112 of conventional construction interposed in an inlet air line 114, 115 connecting the interior of the tire curing mold M with an air supply 116. The windings of the solenoid of valve 112 are connected to "hot" lead 94. It should be understood that air shut-off valve 112 is normally biased towards a closed position and will be moved to its open position only when forward travel limit switches 52 are moved to their closed position. A conventional manually operated tire inflation control valve 120 is also interposed in air inlet line 115 upstream of air shut-off valve 112. Tire inflation control valve 120 is movable between an open "inflate" position which permits pressurized air to flow from air supply 116 to the tire to be inflated, a normally closed position (shown in solid outline), and a "deflate" position wherein air is exhausted from the tire through air line 115 and outlet 121. In the latter position air supply 116 is isolated from air line 114 and outlet 121.

Figure 4:
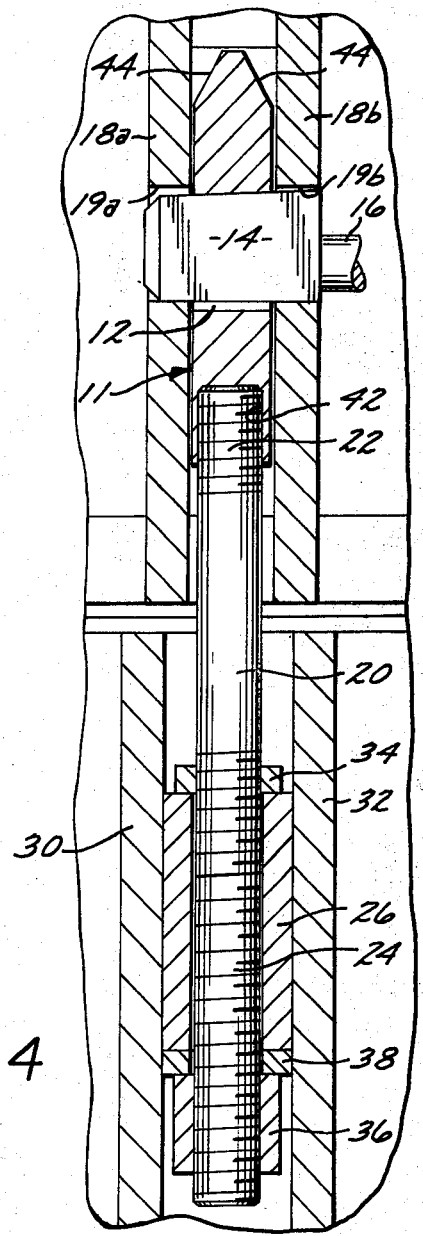
FIG. 4 is a vertical sectional view taken along line 4—4 of FIG. 3.
Figure 5:
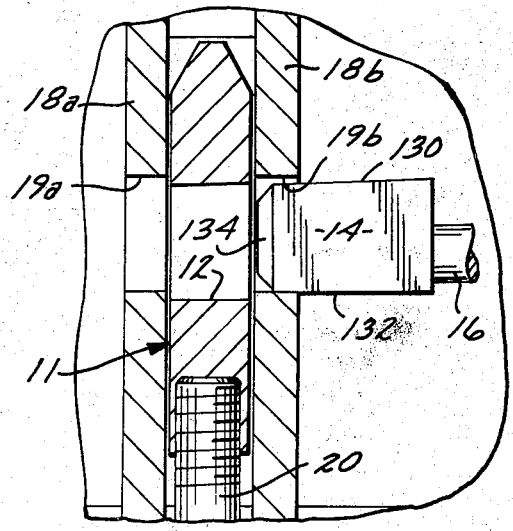
FIG. 5 is a fragmentary view similar to FIG. 4, showing the wedge lock in a retracted position.

Referring again particularly to FIGS. 4 and 5, it is important to note that the upper surface 130 of wedge lock 14 tapers downwardly from its rear end towards its front end at a locking taper of approximately 3 degrees, while the lower surface 132 thereof is substantially horizontal. Note also that the nose of wedge lock 14 is beveled as indicated at 134 to facilitate horizontal movement of such wedge lock into its locking position. The provision of the aforementioned locking taper increases the holding power of the wedge lock securing the upper matrix to the lower matrix.

In the operation of the aforedescribed apparatus, it should be assumed that a tire has been disposed within the lower matrix and the upper matrix has been lowered onto the lower matrix. At this time, the plungers 16 and their respective wedge locks 14 will be in the retracted position shown in FIGS. 5 and 6. Rear travel limit switches 50 will be closed and forward travel limit switches 52 will be open. Inasmuch as the rear travel limit switches are closed, electric current will be connected to the coil 104 so that motor switch 98 is open and consequently motor 62 will not be in operation. Air shut-off valve 112 will be biased to its closed position. Accordingly, should an operator inadvertently move manual control valve 120 to its "inflate" position, air could not flow through air inlet line 115.

To move the wedge locks 14 forwardly into their locked position, the operator presses "on" pump switch 102 so as to activate coil 100 and move switch 98 to its closed position. Motor 62 will then activate pump 60 and the operator will move control valve 64 to its "lock" position. Pressurized hydraulic fluid will then flow into the rear of cylinders 17 so as to move plungers 16 and wedge locks 14 forwardly until the wedge locks are disposed in their locked position shown in FIGS. 1–4. Forward movement of the wedge locks to their fully locked positions is sensed by the closing of forward travel limit switches 52. Such movement opens rear travel limit switches 50. When the forward travel limit switches 52 have been closed, the windings of air shut-off valve 112 will cause the parts of such valve to move to an open position. The operator may then move control valve 120 to its "inflate" position, and the tire to be cured will be inflated. It is important to note that unless each of the wedge locks has been moved into a completely locked position the forward travel limit switches 52 will not be closed, and the control valve 112 will not be opened. Accordingly, even should the operator move control valve 120 to its "inflate" position, the tire will not be inflated. In this manner the lock system of the present invention positively prevents the physical injury and costly property damage which could take place upon inadvertent tire inflation without all of the wedge locks 14 being disposed in a completely locked position. It should also be observed that when each of the forward travel limit switches 52 are closed, current will flow through coil 104 and cause motor switch 98 to open thereby inactivating motor 62. In this manner wedge locks 14 cannot be driven beyond their normal locked position.

After the tire curing operation is completed, the operator will move control valve 120 to its "deflate" position. Control valve 64 will then be moved to its "unlock" position. Pressurized hydraulic fluid will then flow into the front of cylinder 17 so as to retract plunger 16 and move the wedge locks 14 to their unlocked position of FIG. 5. It will be noted that when the wedge locks have been retracted sufficiently to close rear travel limit switches 50, coil 104 will be energized so as to open motor switch 98. In this manner, the pump will be automatically shut-off, even though the control valve 64 is not returned to its "neutral" position. It will also be observed that utilization of the pressure reducing valve 76 set at 3,000 p.s.i. will automatically apply more retracting force on wedge locks 14 than the force employed to move such locks into their locked positions. This feature is desirable because under certain circumstances more force may be required to urge the wedge locks out of passages 14 than is required to move such locks into such passages due to the aforementioned locking taper 130, by way of example, if rubber flashing flows between the upper and lower matrices during a tire curing operation.

Various modifications and changes may be made with respect to the foregoing detailed description without departing from the spirit of the present invention.

I claim:

1. A quick-release lock system for tire curing apparatus having a lower matrix that receives the lower part of a tire to be cured and an upper matrix that receives the upper part of the tire to be cured, with the matrices being vertically separable to receive said tire, and said apparatus further including tire inflating means for pressurizing said tire, said quick-release lock system comprising:
   a plurality of lock arms having their lower ends secured to said lower matrix at circumferentially spaced points therearound, the upper portion of each of said lock arms having a keeper formed with a horizontal passage;
   a plurality of lug means formed on said upper matrix at circumferentially spaced points therearound in general vertical alignment with said lock arms, said lug means each being formed with opening means that are horizontally aligned with the passages of said lock arm keepers when said upper matrix is positioned upon said lower matrix;
   a plurality of wedge locks, each horizontally aligned with the opening means of each of one of said lug means and movable horizontally from an unlocked position to one side of the keeper passage of its respective lock arm to a locked position bridging said opening means and said passage so as to secure said upper matrix to said lower matrix;
   power-operated means on said upper matrix for urging said wedge locks between their locked and unlocked positions;
   sensing means operatively associated with each of said wedge locks to detect whether or not each of said wedge locks have been urged into their locked position; and
   means operated by said sensing means to prevent the tire inflating means from inflating said tire unless each of said wedge locks is disposed in its locked position.

2. A lock system as set forth in claim 1, wherein said sensing means includes electric limit switches actuated by said wedge locks when the latter reach their locked position.

3. A lock system as set forth in claim 1, wherein said sensing means includes electric limit switches actuated by said wedge locks when the latter reach their locked position; and said switches are connected to an air valve forming a part of said tire inflation means, said valve preventing the tire inflation means from inflating the tire unless the limit switches are actuated.

4. A lock system as set forth in claim 1, wherein said wedge locks are formed with a locking taper whereby more force is required to move each said wedge lock out of its locked position than is required to move each said wedge lock into its locked position.

5. A lock system as set forth in claim 2, wherein said wedge locks are formed with a locking taper whereby more force is required to move each said wedge lock out of its locked position than is required to move each said wedge lock into its locked position.

6. In a tire curing apparatus having a lower matrix that receives the lower part of a tire to be cured, an upper matrix that receives the upper part of said tire, an air supply for inflating said tire and an air line to connect the air supply with the tire, a quick-release lock system comprising:
   a plurality of lock arms having their lower ends secured to said lower matrix at circumferentially spaced points therearound, the upper portion of each of said lock arms having a keeper formed with a horizontal passage;
   a plurality of lug means formed on said upper matrix at circumferentially spaced points therearound in general vertical alignment with said lock arms, said lug means each being formed with opening means that are horizontally aligned with the passages of said lock arm keepers when said upper matrix is positioned upon said lower matrix;
   a plurality of wedge locks, each horizontally aligned with the opening means on each of one of said lug means and movable horizontally from an unlocked position to one side of the keeper passage of its respective lock arm to a locked position bridging said opening means and said passage so as to secure said upper matrix to said lower matrix;
   power-operated means on said upper matrix for urging said wedge locks between their locked and unlocked positions;
   sensing means operatively interposed between each of said wedge locks and said lower matrix to detect if said wedge locks have been fully urged into their locked position; and
   a shut-off valve in said air line that is actuated by said sensing means to block the flow of air therethrough unless each of said wedge locks has been fully urged into its locked position.

7. A lock system as set forth in claim 6, wherein said sensing means includes electric limit switches actuated by said wedge locks when the latter reach their locked position.

8. A lock system as set forth in claim 6, wherein said wedge locks are formed with a locking taper whereby more force is required to move each said wedge lock out of its locked position than is required to move each said wedge lock into its locked position.

9. A lock system as set forth in claim 7, wherein said wedge locks are formed with a locking taper whereby more force is required to move each said wedge lock out of its locked position than is required to move each said wedge lock into its locked position.

* * * * *